United States Patent [19]

Hamada

[11] Patent Number: 5,526,993
[45] Date of Patent: Jun. 18, 1996

[54] STATOR COIL WINDING APPARATUS

[75] Inventor: Hiroyuki Hamada, Nimomuya-machi, Japan

[73] Assignee: Odawara Engineering Co., Ltd., Kanagawa, Japan

[21] Appl. No.: 334,277

[22] Filed: Nov. 4, 1994

[30] Foreign Application Priority Data

Nov. 4, 1993 [JP] Japan .................................. 5-275454

[51] Int. Cl.$^6$ ...................................................... H01F 5/04
[52] U.S. Cl. ............................................ 242/432.4; 29/596
[58] Field of Search ............................. 242/1.1 R, 1.1 E; 29/596

[56] References Cited

U.S. PATENT DOCUMENTS

| | | | |
|---|---|---|---|
| 3,040,998 | 6/1962 | Rogers | 242/1.1 R |
| 3,129,499 | 4/1964 | Greene | 29/205 |
| 3,334,825 | 8/1967 | Friedrich | 242/1.1 R |
| 3,524,600 | 8/1970 | Peters | 242/1.1 R |
| 3,677,480 | 7/1972 | Schanke | 242/1.1 R |
| 3,785,212 | 1/1974 | Eminger | 74/23 |
| 3,822,830 | 7/1974 | Peters | 242/1.1 R |
| 4,588,143 | 5/1986 | Hetzel | 242/1.1 R |
| 4,601,213 | 7/1986 | Kimball | 242/1.1 R |
| 4,858,835 | 8/1989 | Luciani et al. | 242/1.1 A |
| 4,991,782 | 2/1991 | Luciani | 242/1.1 R |
| 5,186,405 | 2/1993 | Beakes et al. | 242/1.1 R |

Primary Examiner—Katherine Matecki
Attorney, Agent, or Firm—Thompson Hine & Flory

[57] ABSTRACT

A needle shaft 41 which is provided with a wire W supplying needle 41a is secured at the opposite side relative to a stator core S1 to be wound, on the extended line of a drive shaft 21 which reciprocates in the axial direction by a crank mechanism 5 to 7 and is swung around the axial line by a swing mechanism, a mating linkage portion 41e provided at the needle shaft 41 is linked with a corresponding linkage portion 21c on the drive shaft 21 so that drive shaft 21 and needle shaft 41 are not relatively rotatable, and an inner shaft 22, which operates in the drive shaft 21, is driven downwards by rotation of a rotation screw shaft 33, thereby a claw portion 25b to be pushed in a groove 41d of the mating linkage portion 41e by rotating a clamp lever 25 and the winding to be carried out with the shafts 21, and 41 integrally linked with each other.

12 Claims, 8 Drawing Sheets

STATOR COIL WINDING APPARATUS

FIELD OF THE INVENTION

The present invention relates to a stator coil winder which winds field coils on a stator core of rotary electric devices such as electric motors.

BACKGROUND

A conventional stator coil winder includes a needle shaft into which a wire is inserted and which is reciprocated in an axial direction to cause a needle attached to the end of the needle shaft to be inserted in the slot of a stator core. The needle shaft reciprocally rotates at a predetermined angle around the axial line of the stator core, and the wire is wound around at the neck of each pole. Two types of stator coil winders, a horizontal type and a longitudinal type, are currently in use. The type of winder is determined by the direction of axial movement of the needle shaft. Because these winders have similar compositions, only one, a horizontal winder, will be discussed herein.

Figure 8:
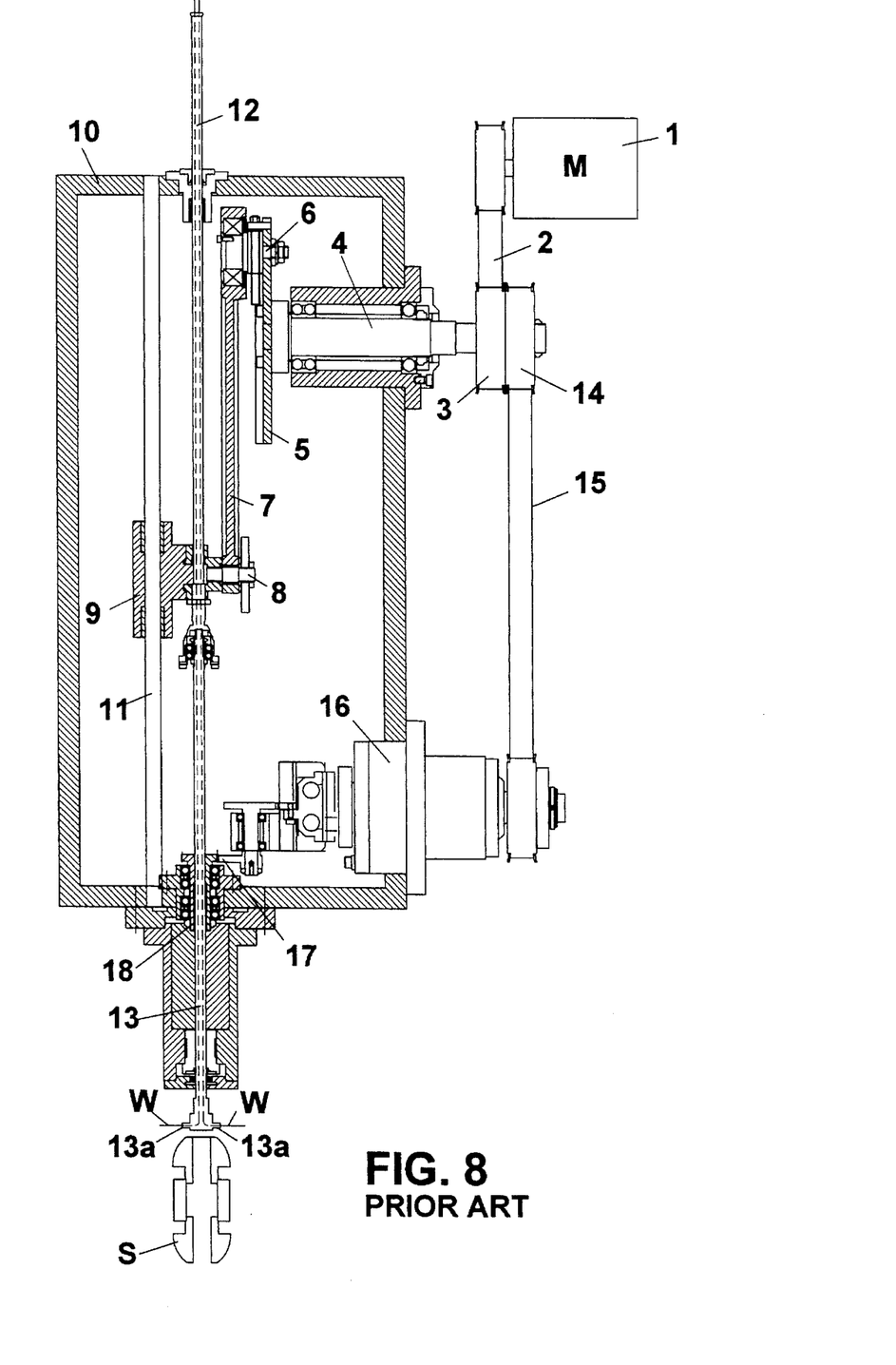
FIG. 8 is a cross sectional view illustrating a conventional stator coil winder.

FIG. 8 presents a cross sectional view showing the principal parts of a conventional horizontal type stator coil winder. In the horizontal winder, a timing belt 2 transmits the rotation of a drive motor 1 to a timing pulley 3. The motor 1 drives and rotates a rotary plate 5 via a rotary shaft 4 integral with the pulley 3. A crank pin 6 journalled to the rotary plate 5 at an eccentric position drives a slider 9 by means of a crank arm 7 and a linkage pin 8, thereby composing the crank mechanism.

A slider 9 slides on a guide shaft 11 in an oil-tight crank case 10 which contains oil. The slider 9 causes a pipe-like linkage shaft 12 linked with the slider 9 by a threaded connection to move in the same direction as the slider 9. A pipe-like needle shaft 13, which simultaneously moves in the axial direction thereof and rotates freely in the rotation direction, is linked with the linkage shaft 12, and a needle 13a is provided at one end thereof. The reciprocation of the needle shaft 13 causes the needle 13a to insert into the stator S.

The rotation of a rotary shaft 4 is transmitted to a conventional swing mechanism 16 which intermittently operates, via a timing pulley 14 and timing belt 15, thereby causing the needle shaft 13, which is spline-connected to a rotating drive gear 18, to be swung to an appointed angle by a fan-shaped gear 17 and a rotating drive gear 18. Stator core S winding is carried out with the wires W which are supplied through the linkage member 12, needle shaft 13 and needle 13a.

A tension device (not illustrated) consisting of, for example, a magnetic particle type electromagnetic clutch, provides wire tension before the wire is inserted into the linkage member 12, thereby preventing disorder of the wire when winding and maintaining a good winding accuracy to increase the occupancy ratio of coils.

These conventional stator coil winders have remarkably long wire routing lengths, such as 1.2 m, because the linkage shaft and needle shaft, into which a wire is inserted, penetrate through a long crank case which is internally provided with a crank mechanism and swing mechanism. Thus, in a case where the wire routing length is long and the position where wire tension will be produced is far from the needle, the wire swings in the linkage shaft and needle shaft producing unnecessary and unwanted tension. For example, in a case where the wire is fine, the tension necessary for good winding, which is given by the tension device, may be 10 kgf. A fine wire may be inadvertently severed if the tension which is generated due to swing of the wire exceeds 10 kgf. For this reason, to reduce wire breakage, the wire will be given an initial tension of 5 kgf, for example. Therefore, in a normal state in which no tension is generated due to swings, the wire tension decreases when winding, thereby decreasing the winding accuracy. This results in the required number of windings not being made on the stator. Furthermore, because the needle shaft is supported on only one side, i.e., at the base side, swing is generated at the tip of the needle on which force operates, thereby adversely influencing the stability of the windings. Furthermore, the wire supplying spools and buckets are located opposite the operator's side of the winder making wire replacement cumbersome.

In view of these problems, the present invention was developed, and it is therefore an object of the invention to increase, by reducing the fluctuations of tension due to swing, the winding accuracy to prevent the wire from being inadvertently severed and, simultaneously, to make wire replacement more efficient.

SUMMARY OF THE INVENTION

In order to achieve the above objects, the invention provides a stator coil winder which winds coils on a stator core by causing a wire supplying needle extending from a needle shaft to be reciprocated in the axial direction while passing through the stator core and simultaneously rotated reciprocally around the axis of the stator core. The apparatus of the present invention includes a drive shaft which is reciprocated axially by means of a crank mechanism; which reciprocally rotates at a predetermined angle around the axis via a swinging or pivoting mechanism; and which is provided at the opposite side of the stator core at the axially extended line of the needle shaft. This invention also provides a means for integrally linking the drive shaft with the needle shaft in an engageable and disengageable state.

The linking means comprises a mating linkage portion, a linkage portion, and a pair of clamp levers. The mating linkage portion extends from one end of the needle shaft and has a pair of grooves in its circumference which have an oval cross section. The linkage portion is formed at one end of the drive shaft and is relatively unrotatably engaged with the mating linkage portion. Each of the clamp levers has a claw portion which is openably and closably journalled at the drive shaft and which is engageable with and disengageable from the grooved portion of the mating linkage portion.

The stator coil winder preferably comprises an inner shaft which smoothly passes through a center bore in the drive shaft. The inner shaft is movable in the axial direction and is not rotatable around the axial line relative to the fixed portion. The winder also preferably comprises an inner shaft interlocking means which opens and closes the clamp lever in interlock with movements of the inner shaft in the axial direction. It is still further preferable that the winder comprises a rotary screw shaft which is screwed in the inner shaft and a drive means for moving the inner shaft in the axial direction by driving the rotary screw shaft. Still furthermore, it is preferable that the stator coil winder is provided with a turn stopping means for stopping the drive shaft and needle shaft at the respective appointed rotating positions.

DETAILED DESCRIPTION OF THE INVENTION

Figure 1:
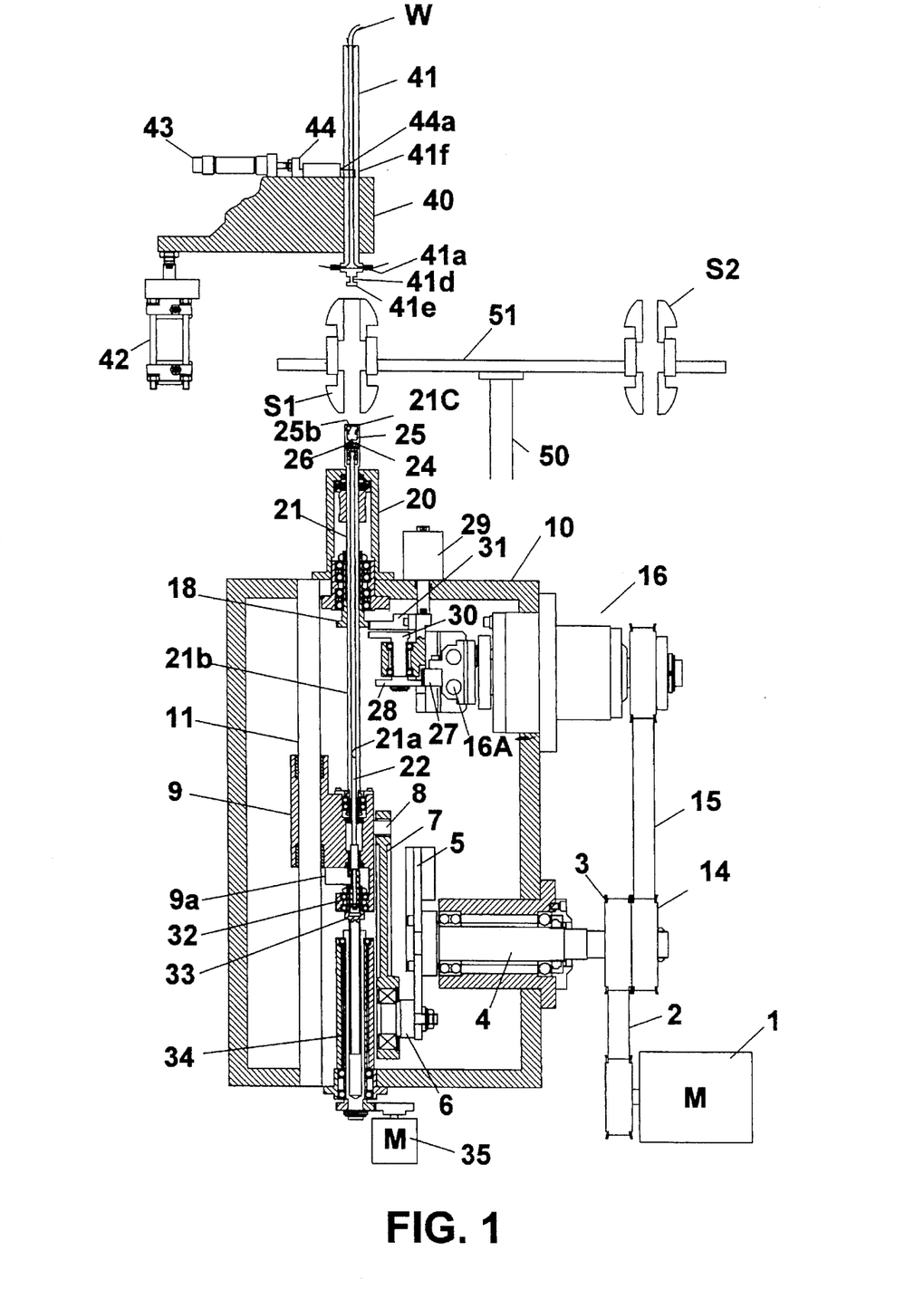
FIG. 1 is a schematic view of a winding apparatus in accordance with the present invention in which the winding needle is disengaged from the drive shaft.

With reference to FIG. 1, the crank mechanism is composed of a motor 1 having a drive shaft, a timing belt 2, a timing pulley 3, a rotary shaft 4, a rotary plate 5, a crank pin 6, a crank arm 7, a slider 9 and a guide shaft 11. Rotation of the motor drive shaft 1 is transmitted to the rotary shaft 4 via the timing belt 2 and timing pulley 3. An integral rotary plate 5 is driven and rotated in an appointed direction. The crank pin 6, which is journalled to the rotary plate 5, drives the slider 9 along guide shaft 11 of the crank case 10 by means of the crank arm 7 and linkage pin 8. The structure of the stator winder described to this point is similar to that of the conventional example shown in FIG. 8, except that the direction of the slider 9 movement is different.

Drive shaft 21 is rotatably fitted in the slider 9 and unslidable in the axial direction between the slider 9 and oil seal bearing 20 fixed to the crank case 10. Drive shaft 21 has a hollow center bore. The inner shaft 22 is loosely fitted in the center bore of the drive shaft 21 so that it can move within drive shaft 21. The drive shaft 21 includes a splined portion 21b which is formed at the outer circumferential portion of drive shaft 21. Drive shaft 21 terminates in an oval linkage portion 21c, which is formed at the inner circumferential surface of the end of drive shaft 21.

With continuing reference to FIG. 1, the rotation drive gear 18 meshes with the spline portion 21b of the drive shaft 21 so that shaft 21 can rotate. To rotate drive shaft 21, the rotation of the drive motor 1 is transmitted to the swing mechanism 16 by way of the timing pulley 14 and timing belt 15. The swing mechanism 16 comprises a first movable portion 16a which is displaced perpendicularly to drive shaft 21 and a second movable portion 16b, which has a fan-shaped gear 28 engageable with a rack portion 27 installed at the first movable portion 16a. The second movable portion 16b is displaced parallel to drive shaft 21 by a cylinder device 29.

The second movable portion 16b is provided with an idle gear 30 coaxial with a fan-shaped gear 28, and a stopper gear 31 of the same pitch. The second movable portion 16b is moved by the cylinder device 29 to cause the idle gear 30 and stopper gear 31 to engage the rotation drive gear 18. While changing stators, as described below, the rotation drive gear 18 is engaged by both the idle gear 30 and stopper gear 31 in order to prevent the drive shaft 21, which is spline-connected with the rotation drive gear 18, from rotating.

Figure 4:
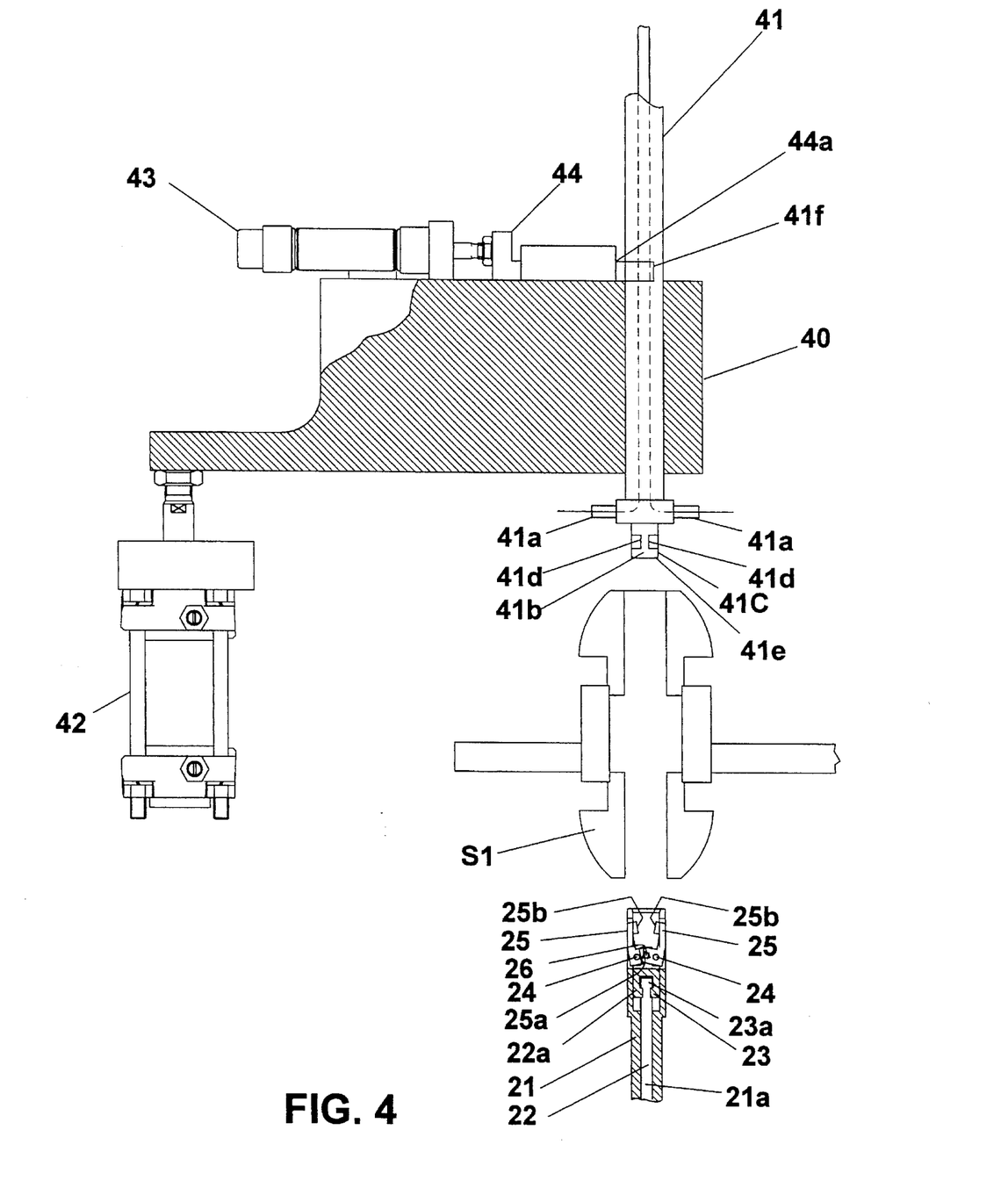
FIG. 4 is a partially enlarged view of the winding needle.

As shown in FIG. 4, an inner interlocking member 23 is loosely fitted at the inner circumferential portion of the drive shaft 21 so that it slides axially. Inner shaft 22 terminates at its first end in head 22a, which is loosely fitted in a notched groove 23a formed inside the inner interlocking member 23, thereby allowing the inner shaft 22 and inner interlocking member 23 to be moved vertically with certain degree of play.

Pins 24 are located at corresponding positions relative to the axial center line of the drive shaft 21. A pair of L-shaped clamp levers 25 are swingably journalled to the pins 24. Each clamp lever 25 includes a notched groove 25a at one end. Interlocking pins 26 engage notched grooves 25a at the end of the inner interlocking member 23. At the end opposite notched grooves 25a, each clamp lever 25 includes an outer claw portion 25b. The inner shaft interlocking means is composed so that, by relative movements of the drive shaft 21 and inner linkage member 23 in the axial direction, the other end claw portions 25b of the clamp levers 25 are opened and closed.

Figure 5:
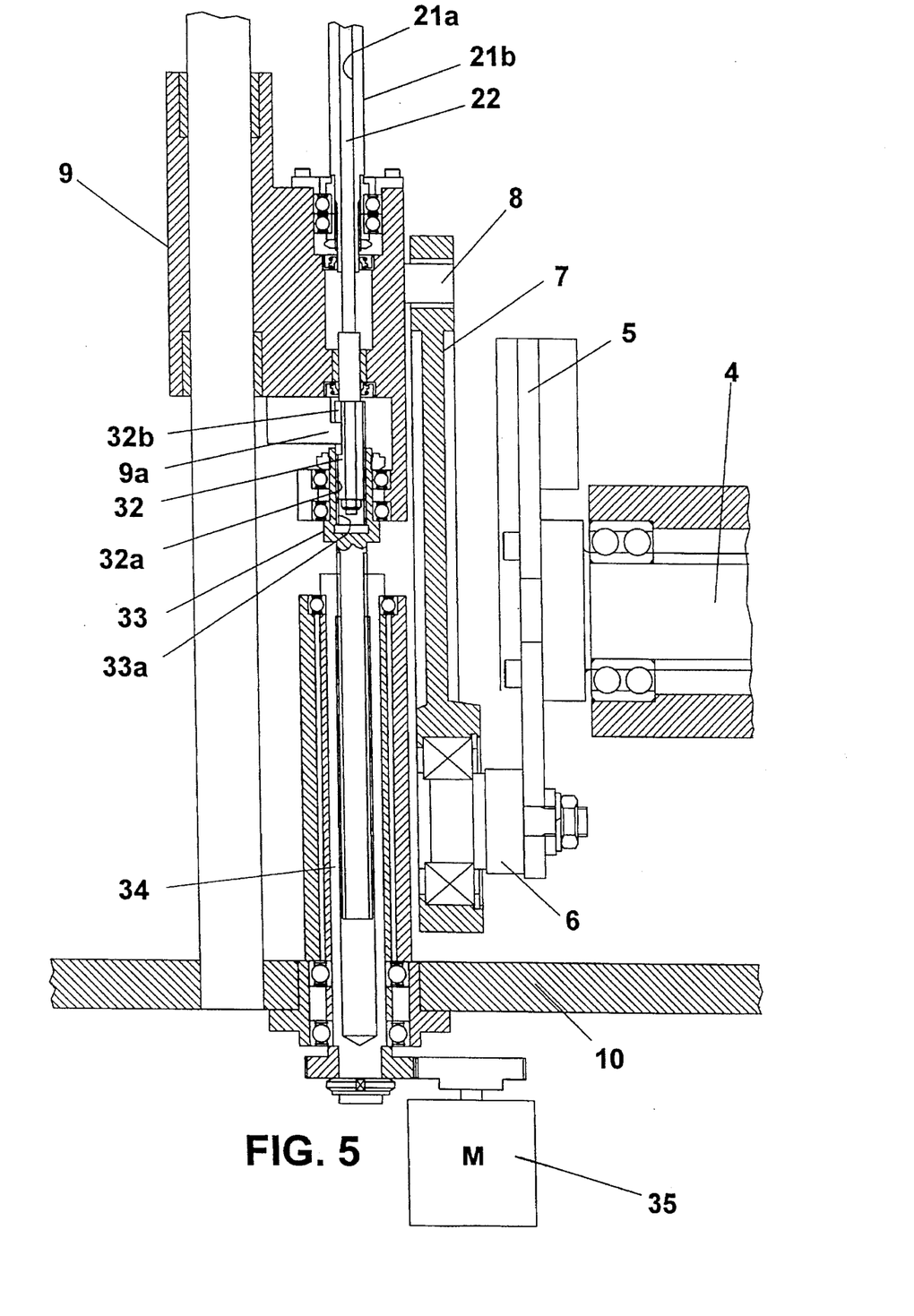
FIG. 5 is a partially enlarged view of the drive shaft linkage.
Figure 9:
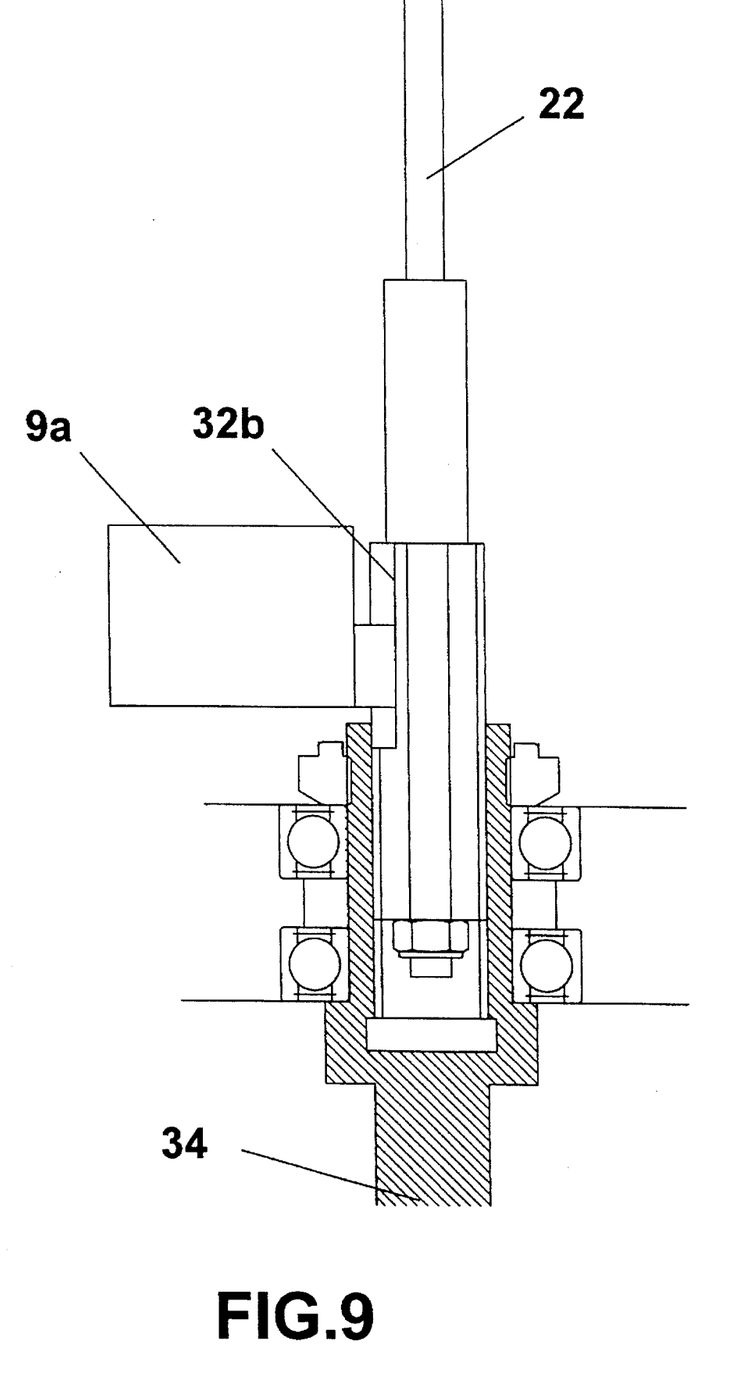
FIG. 9 is an enlarged view of screw member 32.

As shown in FIG. 5, a screw member 32 having a threaded portion 32a at the outer circumferential portion thereof is fixed at the second end of the inner shaft 22. Screw member 32 can be seen in detail in FIG. 9. Screw member 32 also includes a groove 32b. Slider 9 includes a key 9a which engages the key groove 32b to prevent the screw member 32 and inner shaft 22, integral with the screw member 32, from rotating. A rotation screw shaft 33 having an inner circumferential threaded portion 33a is threaded into the threaded portion 32a of the screw member 32. Rotation screw shaft 33 is spline-connected with a rotation shaft 34, which is rotatably attached to the crank case 10 and is driven and rotated by a drive motor 35. The inner shaft 22 is moved axially via the rotation of rotation shaft 34 which rotates rotation screw shaft 33.

Figure 6:
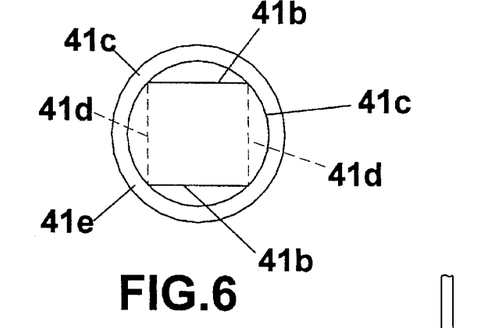
FIG. 6 is a view showing the lower plan of the needle shaft when being observed in the direction of the arrow A in FIG. 4.

A needle guide block 40 is attached to the frame of the apparatus separately from the drive shaft 21. As shown in FIG. 4, a needle shaft 41 is mounted for reciprocation and rotation in the needle guide block 40 on an extended axial line from the drive shaft 21. The needle guide block 40 is moved toward drive shaft 21 by a cylinder 42. A pair of needles 41a for supplying wire protrude from the needle shaft 41. The needle shaft 41 has an integral mating linkage portion journalled thereto. The mating linkage establishes a linkage between the needle shaft 41 and drive shaft 21. As shown in FIG. 6, the mating linkage portion has an oval cross-section and consists of a pair of parallel plane portions 41b and circumferential portions 41c, which form a pair of grooves 41d on the circumferential portions 41c.

As shown in FIG. 4, a pair of anti-rotation grooves 41f (one shown), which are parallel to each other, are provided at the outer circumferential portion of the needle shaft 41. Stopper member 44, which slides toward and away from grooves 41f by means of cylinder 43, is mounted on the needle guide block 40. Stopper member 44 includes an integral forked portion 44a. When forked portion 44a engages grooves 41f, the needle shaft 41 is prevented from moving rotationally and in the axial direction.

The apparatus also includes turntable 51 which rotates around a rotary shaft 50 having its axial line parallel to the axis of the spline shaft 21. As seen in FIG. 1, a pair of stator cores S1 and S2 can be attached to the turntable 51 so that, by rotating the turntable 51 180°, one of the stator cores S1 is positioned between the drive shaft 21 and needle shaft 41.

The centerline of the stator core S1 is aligned with the axial line between the drive shaft 21 and needle shaft 41.

Before winding the stator core S1, the stator core S1 must be aligned with the axial line of the drive shaft 21 and needle shaft 41. The stator core S1 is aligned by rotation of turntable 51. While the stator core S1 is being aligned, both the shafts 21 and 41 are separated from each other and the respective rotation of each stopped by a turn stopping means.

To prevent drive shaft 21 from rotating during connection with needle shaft 41, the second movable portion 16b of the swing mechanism 16 is extended from its previous winding finished state by the cylinder device 29. The rotation drive gear 18 is disconnected from the idle gear 30 and engaged by the stopper gear 31. Stopper gear 31 prevents the drive shaft 21, which is spline-connected to the rotation drive gear 18, from rotating by preventing rotation drive gear 18 from being moved.

To move drive shaft 21 to a position at which it can be linked with the needle shaft 41, the crank mechanism is rotated one-half turn. While the drive shaft 21 is prevented from rotating, rotary drive motor 1 moves the crank pin 6 to its upper dead point by means of a half turn of the rotation shaft 4 and rotary plate 5. This moves the slider 9, and drive shaft 21 and inner shaft 22 which move integrally with slider 9, toward the needle guide block 40. Simultaneously cylinder device 42 moves needle guide block 40 toward drive shaft 21 in a line with the needle shaft 41. During connection with drive shaft 21, the relative displacement of the needle shaft 41 in the rotational direction and axial direction is prevented.

To prevent the needle shaft 41 from moving axially and rotationally, cylinder 43 moves stopper member 44 toward needle shaft 41. Forked portion 44a of stopper member 44 engages grooves 41f in needle shaft 41. When stopper member 44a engages grooves 41f, needle shaft 41 is prevented from moving both axially and rotationally. Additionally, when stopper member 44a engages grooves 41f, needle shaft 41 is aligned for linkage with drive shaft 21.

Figure 7:
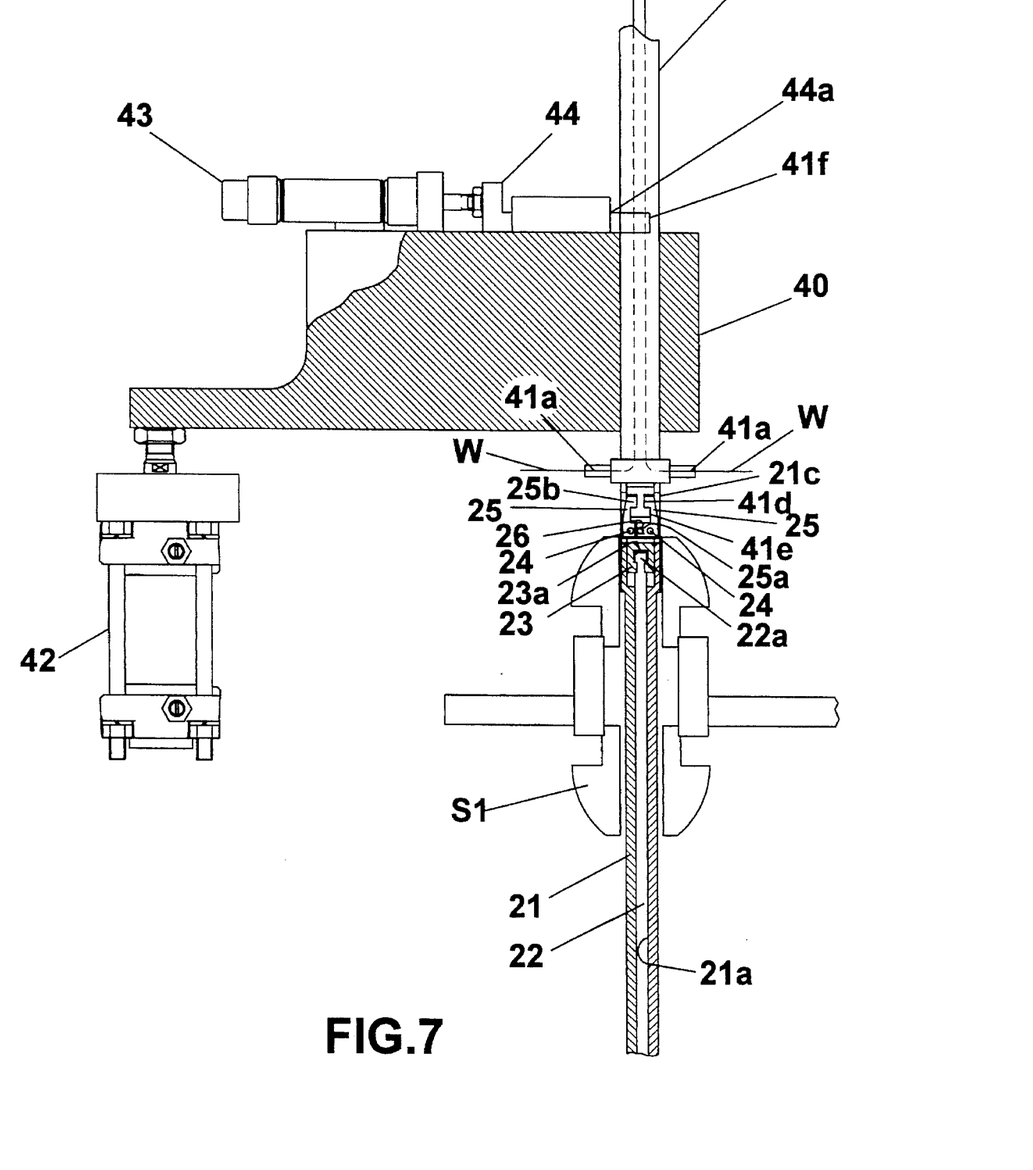
FIG. 7 is a partially enlarged view showing only the upper part of FIG. 2.

Once shafts 21 and 41 have been aligned, they are linked together. As shown in FIG. 7, the mating linkage portion 41e extends from the lower end portion of the needle shaft 41 is mated with the linkage portion 21c of the drive shaft 21 by the motion of the drive shaft 21 and needle shaft 41. Needle guide block 40 moves needle shaft 41 toward drive shaft 21. As the needle guide block 40 moves needle shaft 41 toward shaft 21, the drive shaft 21 is simultaneously moved toward the needle shaft 41 by the crank mechanism. The end portion of the mating linkage portion 41e pushes the claw portion 25b of the clamp lever 25 and causes the clamp levers 25 to be opened. Then, the mating linkage portion 41e of the needle shaft 41 is linked with the linkage portion of the drive shaft 21 so as not be rotatable.

Figure 2:
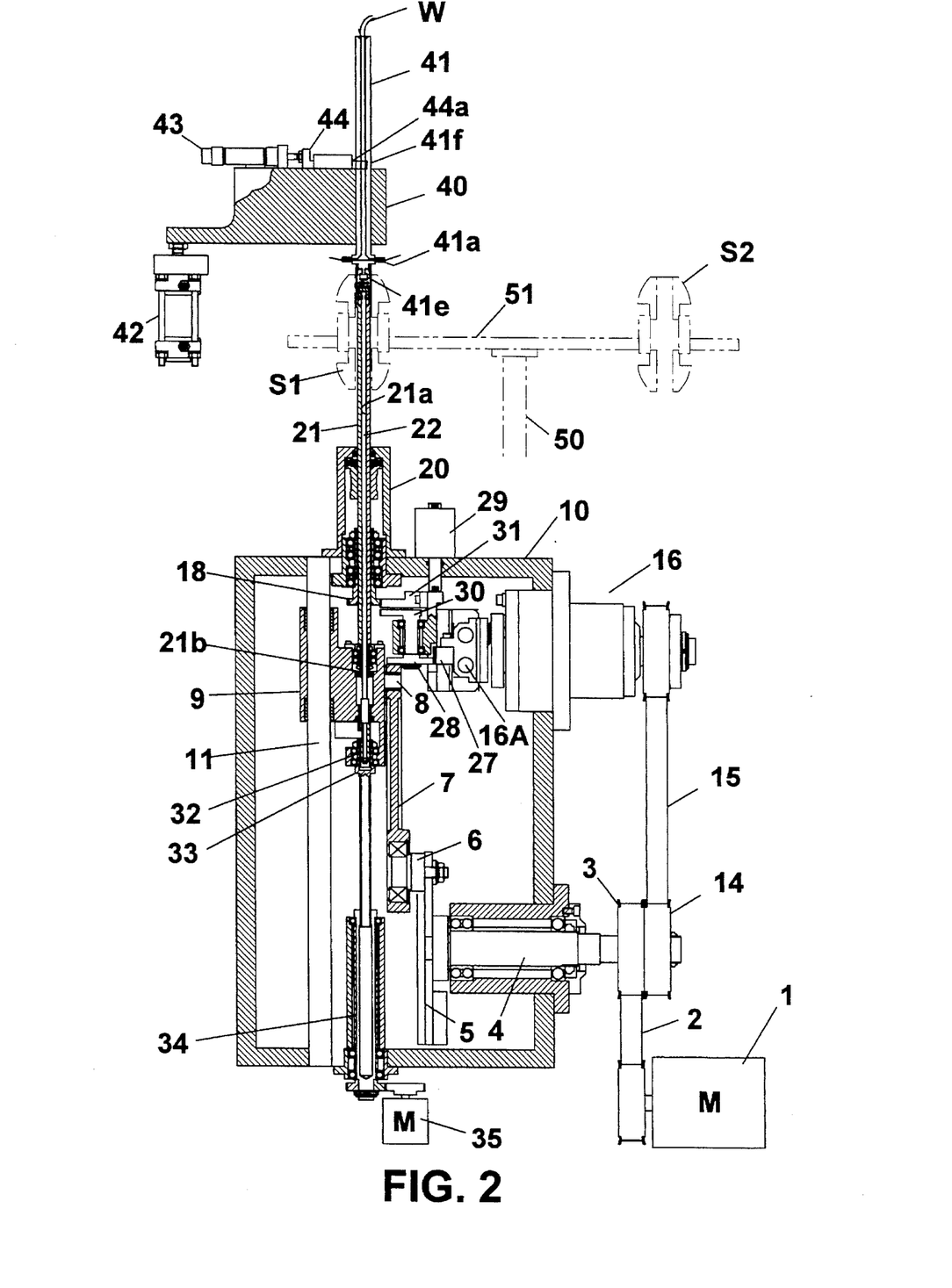
FIG. 2 is a schematic view showing the apparatus of FIG. 1 with the needle shaft engaged with the drive shaft and the needle shaft is locked.

As shown in FIG. 2, to close clamp levers 25, the rotation shaft 34 is rotated by the drive motor 35 in a first direction to cause the rotation screw shaft 33, which is spline-connected thereto, to be rotated in the same direction. When screw shaft 33 is rotated, the screw member 32 screwed therein is retracted along with the inner shaft 22, and the inner interlock member 23 which is interlocked with the inner shaft 22 is retracted. Thereby, the clamp levers 25 are rotated inwardly by way of the interlock pin 26 of the inner interlock member 23 to cause the claw portions 25b to engage the grooves 41d. Thus, the drive shaft 21 and needle shaft 41 become integrally and tightly linked with each other, so that they are not relatively rotatable and movable axially.

Figure 3:
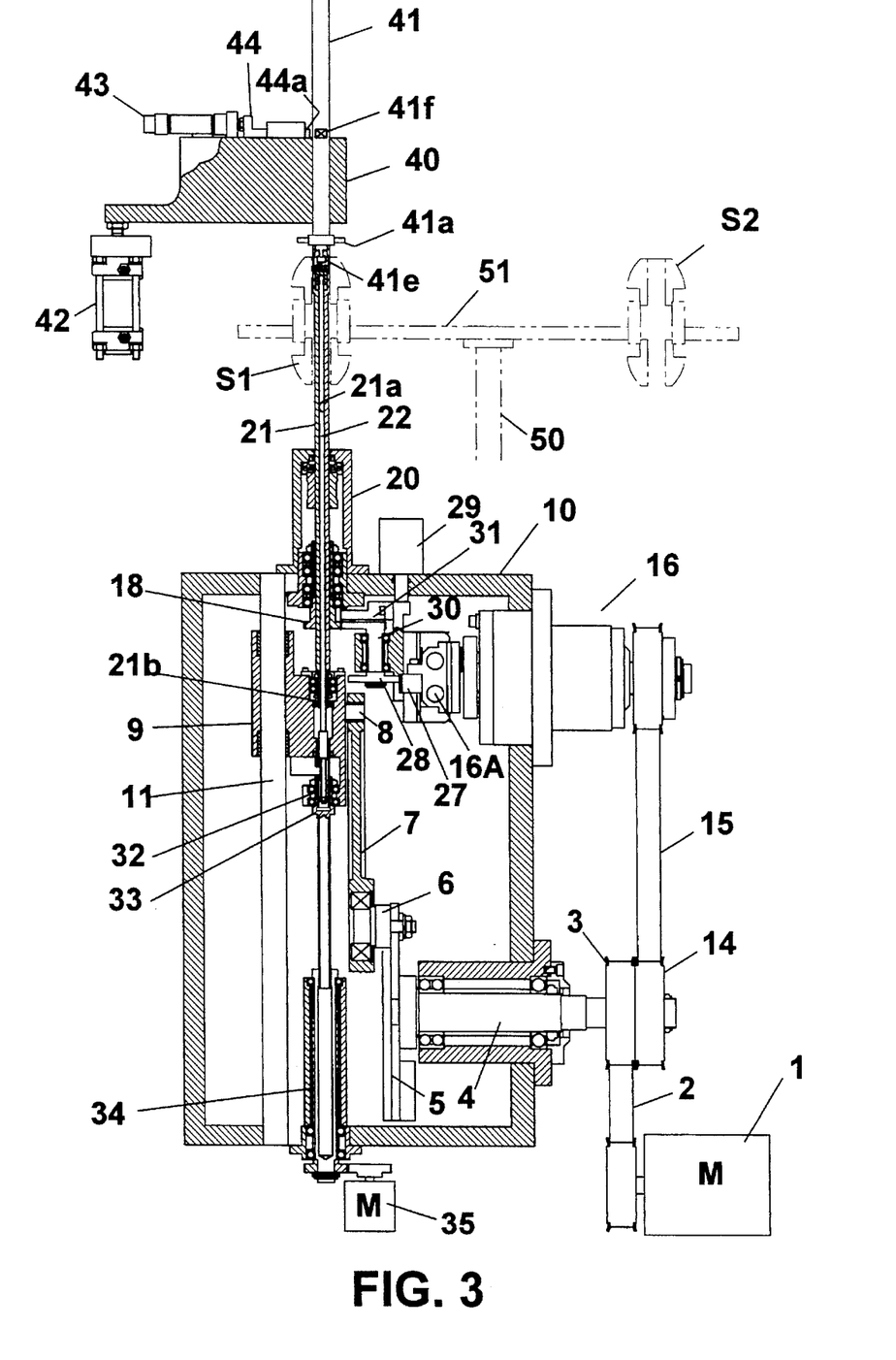
FIG. 3 is a schematic cross sectional view showing the apparatus of FIG. 2 with the needle shaft unlocked.

As shown in FIG. 3, after the drive shaft 21 is linked with the needle shaft 41, the movable portion 16b is retracted by the cylinder device 29 to cause the stopper gear 31 to disconnect from the rotation drive gear 18 and the idle gear 30 to engage the rotation drive gear 18. Simultaneously, the stopper member 44 is retracted by the cylinder device 43, and the fork portion 44a thereof is disconnected from the turn stopping grooves 41f of the needle shaft 41, thereby causing it to be freely rotatable and slidable relative to the needle guide block 40. The needle shaft 41 rotates and slides in synchronization with the rotation and sliding of the drive shaft 21.

The drive shaft 21 reciprocates axially and swings around the axial line of the stator core 51 at both the stroke ends. A wire W passes through the needle shaft 41 and out through the needle 41a. The wire W is wound on the neck portion of the respective poles of the stator core S1.

The primary stator winding motion of drive shaft 21 is provided by slider 9. Motor drive shaft 1 rotates rotary shaft 4 by means of timing belt 2 and timing pulley 3. Rotary shaft 4 causes rotary plate 5 to rotate causing slider 9 to reciprocate linearly along guide shaft 11. The linear reciprocation of slider 9 causes drive shaft 21 to reciprocate axially. The axial motion of shaft 21 is translated to winding needle shaft 41 through the linkage between shafts 21 and 41. This causes winding needle 41a to axially reciprocate.

As the winding needle is axially reciprocated, drive shaft 21 is rotated by idle gear 30. Swing mechanism 16, which is indirectly driven by motor 1, drives a gear train which translates the rotary movement of motor drive shaft 1 to the linear movement first movable portion 16a. First movable portion 16a include a rack which causes a similar motion in fan shaped gear 28. Motion of first movable portion 16a in a first direction causes gear 28 to rotate in the same direction. Gear 28 then causes gear 30 to rotate in the opposite direction. As gear 30 rotates, the splined portion of shaft 21 rotates shaft 21 causing winding needle 41a to rotate in a first direction by means of the linkage established between the two shafts. As portion 16a rotates in a second direction, gear 38 rotates in the same direction as portion 16a. This in turn causes gear 30 and, subsequently, the splined portion of shaft 21 to rotate shaft 21 in a second, opposite direction. Rotation of shaft 21 in this second direction causes winding needle 41a to rotate in the second, opposite direction.

After the stator core S1 has been wound, the crank pin 6 is placed at its upper dead point and the drive shaft 21 is positioned at its elevation end. The movable portion 16b is extended by cylinder 29 to prevent the spline shaft 21 from rotating, as described above. At the same time, the stopper member 44 of the needle guide block 40 is extended preventing the needle shaft 41 from rotating and moving in the axial direction, as described above. Next, the drive motor is rotated in a second direction to cause the rotation shaft 34 and rotation screw shaft 33, which is spline-connected to rotation shaft 34, to be rotated in the same direction. Then, the inner shaft 22 integral with the screw member 32, which is screwed in the rotation screw shaft 33, is extended by the rotation of screw member 32 to cause the inner interlock member 23 to be extended. As the inner interlock member 23 is being extended, the interlock pin 26 forces the clamp levers 25 to rotate outwardly via the notched grooves 25a. The claw portions 25b then release the grooves 41d of the mating linkage portion 41e.

As the drive shaft 21 is being retracted via the crank mechanism and the drive motor 1, the needle guide block 40 is retracted away from drive shaft 21 by the cylinder device 42 to cause the drive shaft 21 and the needle shaft 41 to disengage. The turntable 51 is then rotated 180° so that the next stator core S2 is placed at the winding position. The completed stator core S1 is removed, and the next stator core to be wound is rotated into position on turntable 51.

One skilled in the art will understand that all of the above described operations can be automatically performed by a pre-programmed conventional control means (not illustrated).

The above preferred embodiment refers to a situation where the size of stator cores is constant and the stroke of the drive shaft, which drives the needle shaft 40, in the axial direction is not changed. One skilled in the art will appreciate that this apparatus can also be used to wind stator cores having varying sizes. In a case where each stator core has a differing size and it is accordingly necessary to change the stroke of needle shaft 21, for example, as described in commonly assigned Japanese patent publication Hei-4-183249 or in commonly assigned U.S. patent application Ser. No. 08/183,361, if the crank pin 6 of the crank mechanism is fixed in position at the returning end of the drive shaft 21 to cause the center of rotation position to be displaced and the distance between the center of rotation thereof and the crank pin center is increased or decreased one-half the amount of the stroke change, only the stroke length is increased or decreased with the returning end of the drive shaft 21 fixed. Thus, stroke adjustment can be simplified.

In an alternate embodiment, the needle guide block 40 can be provided with two needle shafts 41 arranged parallel to each other. The guide block 40 is mounted on the frame so that it can be rotated 180 degrees around its center line. To change the needle shafts 41, the guide block 40 is rotated to replace the shaft currently being used with an auxiliary shaft. Thus, if one of the needle shafts 41 runs out of wire, the auxiliary needle shaft is available to instantly supply wire. It is, therefore, possible to automatically supply wire by using two interchangeable needle shafts.

Although only one means for connecting the drive shaft 21 with the winding needle shaft 41 has been described in detail herein, those skilled in the art can appreciate that a wide variety of mechanical linkages can be used as long as they ensure that one shaft does not rotate in respect to the other. Further, one skilled in the art can also appreciate that the mating linkage portion 41e, which is attached to winding needle shaft 41, can be attached to the drive shaft 21 and that the linkage portion 21e of the drive shaft 21 can be attached to the winding needle shaft 41 without affecting the operation of the apparatus of this invention.

As described above, wire W in this apparatus is not supplied through the crank case 10 as it is in conventional winders. The wire is provided through the needle shaft 41 at the opposite side of the stator core 51 to be wound from the drive shaft 21. The needle shaft 41 reciprocates an appointed distance in the axial direction and swings around the axial line of the stator core 51. The shafts, 21 and 41, are integrally combined with each other while winding. Because the wire W travels through the apparatus as described above and does not have to travel the length of the crank case as in convention winders, the wire routing distance of this apparatus is shortened to one-sixth of the conventional wire routing distance. The apparatus of this invention makes it easy to adjust the tension, to decrease the tension and to decrease the tension fluctuation, thereby, achieving superior windings.

As also described above, the stator coil winder according to this invention includes a drive shaft 21, which reciprocates in the axial direction and reciprocally rotates around the axial line of a stator core 51. The needle shaft 41, having a wire supplying needle 41a protruding therefrom, and the drive shaft 21 are composed so that they can be separated from and linked with each other. Because the wire routing distance can be shortened, the swing in the needle shaft 41 is suppressed and unnecessary tension of the wire, which results from the swing, is decreased reducing the fluctuation in wire tension. Simultaneously, as the needle shaft 41 is joined with the drive shaft 21, a two-sided retaining structure can be employed to decrease the needle swing, which greatly contributes to improving the winding accuracy. Furthermore, because the wire is supplied at the operator's side of the apparatus, the replacement of wires is facilitated to make the wire replacement more efficient.

Still furthermore, if a means for linking the drive shaft 21 with the needle shaft 41 is composed so that it consists of a mating linkage portion extending from one end of the needle shaft 41, a linkage portion formed at one end of the drive shaft 21 and clamp levers 25 journalled openably and closably on the drive shaft side, the linkage portion has a remarkably simple structure. If the clamp levers 25 are opened and closed while interlocking with the movement of the inner shaft 22, which passes through the center bore of the drive shaft 21, in the axial direction, the linkage of the drive shaft 21 with the needle shaft 41 becomes remarkably tight. Furthermore, if the inner shaft 22 is moved in the axial direction by utilizing a screw feed, the opening and closing of the clamp levers 25 can be automated. Because the apparatus includes a turn stopping means for stopping the drive shaft 21 and needle shaft 41 at the required rotation position, the rotation position thereof is fixed when both the shafts are separated from each other to facilitate the linkage thereof.

Having described the invention in detail and by reference to preferred embodiments thereof, it will be apparent that modifications and variations are possible without departing from the scope of the invention defined in the appended claims.

What is claimed is:

1. An apparatus for winding a stator comprising:

a drive shaft assembly including a drive shaft;

a winding needle assembly including a winding needle shaft linkable with the drive shaft, and a wire supplying needle extending from the winding needle shaft; and a linkage for linking the drive shaft to the winding needle shaft;

the drive shaft assembly and the winding needle assembly being spaced from one another with the drive shaft coaxially aligned with the winding needle shaft such that a stator can be inserted between the winding needle shaft and the drive shaft prior to winding.

2. The apparatus of claim 1 wherein the linkage comprises a mating portion extending from the end of the winding needle shaft adjacent to the drive shaft and a linkage portion on the end of the drive shaft adjacent to the winding needle shaft, the linkage portion including a clamp which engages the mating portion on the winding needle shaft.

3. The apparatus of claim 2 wherein the drive shaft includes a central bore and the drive shaft assembly further includes an inner shaft which passes through the central bore and is moveable axially but not rotatably with respect to the drive shaft, an interlock means which opens and closes the clamp by the axial movement of the inner shaft with respect to the drive shaft, and means for moving the inner shaft with respect to the drive shaft.

4. The apparatus of claim 3 wherein the means for moving the inner shaft with respect to the drive shaft further comprises a rotary screw shaft threaded to the inner shaft and a drive means for moving the inner shaft axially by driving and rotating the rotary screw shaft such that axial movement of the inner shaft a first direction causes the clamp to open and axial movement of the inner shaft in a second direction causes the clamp to close.

5. The apparatus of claim 3 further including a means for preventing rotation of the drive shaft with respect to the needle shaft when the drive shaft and the needle shaft are not linked together to insure that the drive shaft and the needle shaft are angularly aligned.

6. The apparatus of claim 1 further including a means for preventing rotation of the drive shaft with respect to the needle shaft when the drive shaft and the needle shaft are not linked together to insure that the drive shaft and the needle shaft are angularly aligned.

7. The apparatus of claim 6 wherein the means for preventing rotation of the needle shaft includes a stopper member having a forked portion which engages a corresponding pair of grooves on the needle shaft.

8. The apparatus of claim 7 further including a cylinder which moves the forked portion of the stopper member into contact with the grooves on the needle shaft.

9. The apparatus of claim 6 wherein the drive shaft assembly further includes a splined portion which is engaged by a rotation drive gear to rotate the drive shaft and the rotation preventing means includes a stopper gear which detachably engages the rotation drive gear to prevent rotation of the rotation drive gear and subsequently the rotation of the drive shaft and a means for moving the stopper gear into contact with the rotation drive gear.

10. The apparatus of claim 1 wherein the winding needle assembly further includes a means for axially moving the winding needle shaft into a position in which the winding needle shaft can be linked with the drive shaft.

11. The apparatus of claim 1 wherein the drive shaft includes a means for axially moving the drive shaft through the stator and into a position in which the drive shaft can be linked with the winding needle shaft.

12. The apparatus of claim 11 wherein the means for axially moving the drive shaft also drives the drive shaft and linked winding needle shaft during winding.

\* \* \* \* \*